United States Patent
Cui et al.

(10) Patent No.: US 9,736,022 B2
(45) Date of Patent: Aug. 15, 2017

(54) METHODS AND APPARATUS TO UPGRADE COMMUNICATION SERVICES IN SUBSCRIBER DISTRIBUTION AREAS

(71) Applicant: AT&T Intellectual Property I, L.P., Atlanta, GA (US)

(72) Inventors: Zhi Cui, Marietta, GA (US); James William Rembert, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/011,197

(22) Filed: Jan. 29, 2016

(65) Prior Publication Data
US 2016/0149756 A1  May 26, 2016

Related U.S. Application Data (63) Continuation of application No. 12/511,795, filed on Jul. 29, 2009, now abandoned.

(51) Int. Cl.
*H04B 10/00* (2013.01)
*H04L 12/24* (2006.01)
(Continued)

(52) U.S. Cl.
CPC ......... *H04L 41/082* (2013.01); *H04B 10/272* (2013.01); *H04Q 11/0067* (2013.01); *H04Q 11/0071* (2013.01); *H04Q 2011/0079* (2013.01)

(58) Field of Classification Search
USPC ...................................................... 398/66–73
See application file for complete search history.

(56) References Cited

U.S. PATENT DOCUMENTS

| 4,540,846 A | 9/1985 | Smith |
| 4,768,188 A | 8/1988 | Barnhart et al. |

(Continued)

FOREIGN PATENT DOCUMENTS

| CN | 101001120 | 7/2007 |
| EP | 1018851 | 12/2003 |

(Continued)

OTHER PUBLICATIONS

Hui et al. "Subcarrier Multiplexing for High-Speed Optical Transmission," Journal of Lightwave Technology, vol. 20, No. 3, Mar. 2002, pp. 417-427.

(Continued)

*Primary Examiner* — Agustin Bello
(74) *Attorney, Agent, or Firm* — Hanley, Flight & Zimmerman, LLC

(57) ABSTRACT

An optical network unit (ONU) is installed to communicate with an optical line terminal (OLT) located at a remote terminal (RT). The ONU includes a first subscriber downlink interface to serve a first subscriber premises and a second subscriber downlink interface to serve a second subscriber premises. The RT is located apart from a central office (CO) and in communication with the CO. A first removably attachable subscriber downlink module is communicatively coupled to the first subscriber downlink interface. A second removably attachable subscriber downlink module is communicatively coupled to the second subscriber downlink interface. The first removably attachable subscriber downlink module is replaced with a third removably attachable subscriber downlink module. An optical transmission medium is connected between the third removably attachable subscriber downlink module and the first subscriber premises while retaining a second electrically conductive medium communicatively coupled to the second subscriber downlink interface.

21 Claims, 7 Drawing Sheets

(51) Int. Cl.
*H04B 10/272* (2013.01)
*H04Q 11/00* (2006.01)

(56) References Cited

U.S. PATENT DOCUMENTS

| | | | |
|---|---|---|---|
| 5,150,246 A | 9/1992 | Kimball et al. | |
| 5,321,541 A * | 6/1994 | Cohen | H04B 10/038 398/144 |
| 5,523,869 A | 6/1996 | Still et al. | |
| 5,528,582 A * | 6/1996 | Bodeep | H04N 7/17309 348/E7.07 |
| 5,636,139 A * | 6/1997 | McLaughlin | H04N 7/08 348/E7.024 |
| 5,687,212 A * | 11/1997 | Kinser, Jr. | H04M 3/08 379/14 |
| 5,699,176 A * | 12/1997 | Cohen | G02B 6/12007 398/116 |
| 5,708,753 A * | 1/1998 | Frigo | H04B 10/032 385/147 |
| 5,729,370 A * | 3/1998 | Bernstein | H04L 25/4921 398/116 |
| 5,767,999 A | 6/1998 | Kayner | |
| 5,790,634 A * | 8/1998 | Kinser, Jr. | H04M 3/08 379/15.03 |
| 5,793,410 A | 8/1998 | Rao | |
| 5,879,173 A | 3/1999 | Poplawski et al. | |
| 5,880,864 A | 3/1999 | Williams et al. | |
| 5,911,019 A * | 6/1999 | Cohen | H04B 10/272 385/147 |
| 5,953,389 A * | 9/1999 | Pruett | H04L 12/2856 379/15.02 |
| 6,002,502 A * | 12/1999 | Pomp | H04Q 11/0005 398/1 |
| 6,026,144 A * | 2/2000 | Bernstein | H04Q 3/0062 379/12 |
| 6,031,300 A | 2/2000 | Moran | |
| 6,147,786 A * | 11/2000 | Pan | H04J 14/0286 348/E7.07 |
| 6,160,946 A | 12/2000 | Thompson et al. | |
| 6,241,920 B1 | 6/2001 | Cotter et al. | |
| 6,253,235 B1 | 6/2001 | Estes | |
| 6,278,829 B1 * | 8/2001 | BuAbbud | G02B 6/4452 385/135 |
| 6,362,908 B1 | 3/2002 | Kimbrough et al. | |
| 6,374,307 B1 | 4/2002 | Ristau et al. | |
| 6,385,030 B1 | 5/2002 | Beene | |
| 6,385,366 B1 * | 5/2002 | Lin | H04J 14/0226 385/147 |
| 6,389,030 B1 | 5/2002 | Coden | |
| 6,427,035 B1 | 7/2002 | Mahony | |
| 6,431,765 B1 | 8/2002 | Chen et al. | |
| 6,454,597 B1 | 9/2002 | Marsh et al. | |
| 6,480,487 B1 * | 11/2002 | Wegleitner | H04M 3/005 370/354 |
| 6,496,639 B1 * | 12/2002 | BuAbbud | H04B 10/27 385/135 |
| 6,549,906 B1 * | 4/2003 | Austin | G06F 17/30569 |
| 6,577,414 B1 | 6/2003 | Feldman et al. | |
| 6,665,319 B1 | 12/2003 | Bergaire et al. | |
| 6,684,030 B1 | 1/2004 | Taylor et al. | |
| 6,684,242 B1 * | 1/2004 | Bahlmann | G06Q 30/04 709/222 |
| 6,738,983 B1 | 5/2004 | Rao et al. | |
| 6,785,265 B2 | 8/2004 | White et al. | |
| 6,842,845 B2 | 1/2005 | Ganapathy et al. | |
| 6,886,181 B1 | 4/2005 | Dodds et al. | |
| 6,931,003 B2 | 8/2005 | Anderson | |
| 6,961,335 B1 * | 11/2005 | Millet | H04L 12/42 370/356 |
| 6,980,725 B1 * | 12/2005 | Swieconek | G02B 6/4452 385/135 |
| 7,006,497 B2 | 2/2006 | Dove et al. | |
| 7,007,297 B1 | 2/2006 | Woodward | |
| 7,095,958 B1 | 8/2006 | Woodward | |
| 7,133,441 B1 | 11/2006 | Barlev et al. | |
| 7,139,484 B2 | 11/2006 | Kurumida et al. | |
| 7,184,428 B1 * | 2/2007 | Gerszberg | H04L 12/2856 370/352 |
| 7,228,132 B2 * | 6/2007 | Gopalakrishnan | H04L 41/5064 379/201.02 |
| 7,274,881 B2 | 9/2007 | Hochbaum | |
| 7,278,152 B1 | 10/2007 | Rao | |
| 7,278,158 B2 | 10/2007 | Peretti | |
| 7,280,757 B1 * | 10/2007 | Britz | H04J 14/0227 398/58 |
| 7,315,695 B2 * | 1/2008 | Chang | H04Q 11/0071 398/67 |
| 7,356,042 B2 | 4/2008 | Ethridge et al. | |
| 7,366,203 B2 | 4/2008 | Deas | |
| 7,366,391 B2 * | 4/2008 | Ellison | G02B 6/4452 385/134 |
| 7,376,191 B2 | 5/2008 | Melick et al. | |
| 7,409,127 B1 * | 8/2008 | Hurley | G02B 6/3817 385/101 |
| 7,444,056 B2 * | 10/2008 | Allen | G02B 6/3878 385/135 |
| 7,599,597 B2 * | 10/2009 | Kerry | G02B 6/4466 385/134 |
| 7,778,546 B2 * | 8/2010 | Sucharczuk | H04H 20/76 398/72 |
| 7,809,235 B2 * | 10/2010 | Reagan | G02B 6/3849 385/135 |
| 7,937,291 B2 | 5/2011 | Carlson et al. | |
| 2001/0037442 A1 | 11/2001 | Ganapathy et al. | |
| 2002/0012347 A1 * | 1/2002 | Fitzpatrick | G06F 8/61 370/392 |
| 2002/0181475 A1 | 12/2002 | Dove et al. | |
| 2003/0036383 A1 * | 2/2003 | Zawislak | H04W 8/18 455/433 |
| 2003/0185567 A1 | 10/2003 | Kurumida et al. | |
| 2003/0200549 A1 | 10/2003 | Rao et al. | |
| 2004/0076166 A1 | 4/2004 | Patenaude | |
| 2004/0165889 A1 | 8/2004 | Mahony et al. | |
| 2004/0175173 A1 | 9/2004 | Deas | |
| 2004/0184803 A1 * | 9/2004 | Chang | H04Q 11/0071 398/58 |
| 2004/0264683 A1 | 12/2004 | Bye | |
| 2005/0152385 A1 | 7/2005 | Cioffi | |
| 2005/0213974 A1 | 9/2005 | Deas | |
| 2006/0077891 A1 | 4/2006 | Smith et al. | |
| 2006/0153517 A1 | 7/2006 | Reagan et al. | |
| 2006/0153565 A1 | 7/2006 | Park et al. | |
| 2006/0171714 A1 | 8/2006 | Dove | |
| 2006/0251094 A1 | 11/2006 | Van Vleck et al. | |
| 2006/0275036 A1 | 12/2006 | Hochbaum et al. | |
| 2007/0019956 A1 | 1/2007 | Sorin et al. | |
| 2007/0025734 A1 * | 2/2007 | Oogushi | H04J 14/02 398/71 |
| 2007/0230955 A1 | 10/2007 | Miller et al. | |
| 2008/0011990 A1 | 1/2008 | Kostet et al. | |
| 2008/0019501 A1 | 1/2008 | Miller, III et al. | |
| 2008/0046938 A9 | 2/2008 | Rao et al. | |
| 2008/0063399 A1 | 3/2008 | Mallya et al. | |
| 2008/0069004 A1 | 3/2008 | Huff | |
| 2008/0193130 A1 | 8/2008 | Chae et al. | |
| 2008/0232819 A1 * | 9/2008 | Mukai | H04L 12/5695 398/168 |
| 2008/0253769 A1 | 10/2008 | Liu | |
| 2008/0290729 A1 | 11/2008 | Schoenberg et al. | |
| 2009/0010657 A1 | 1/2009 | Kazutaka | |
| 2009/0097845 A1 * | 4/2009 | Campbell | G02B 6/4452 398/17 |
| 2009/0111449 A1 * | 4/2009 | Mutikainen | H04M 7/0081 455/418 |
| 2009/0212971 A1 | 8/2009 | Casey et al. | |
| 2009/0220231 A1 * | 9/2009 | Zimmel | H04J 14/0226 398/72 |
| 2009/0254966 A1 * | 10/2009 | Josephs | H04N 7/17318 725/140 |
| 2009/0262912 A1 | 10/2009 | Bremer et al. | |

(56) References Cited

U.S. PATENT DOCUMENTS

| | | | | |
|---|---|---|---|---|
| 2009/0263133 | A1* | 10/2009 | Nakagawa | H04J 14/0226 398/67 |
| 2009/0274463 | A1* | 11/2009 | Bernard | H04J 3/0632 398/72 |
| 2010/0103947 | A1 | 4/2010 | Anschutz et al. | |
| 2010/0104287 | A1* | 4/2010 | Biegert | H04J 3/1694 398/67 |
| 2010/0119235 | A1 | 5/2010 | Cui et al. | |
| 2011/0026930 | A1* | 2/2011 | Cui | H04B 10/272 398/115 |
| 2011/0265109 | A1* | 10/2011 | Goyet | H04L 43/04 725/9 |
| 2016/0149756 | A1* | 5/2016 | Cui | H04B 10/272 398/45 |

FOREIGN PATENT DOCUMENTS

| | | |
|---|---|---|
| JP | 2007295506 | 11/2007 |
| KR | 713062 | 4/2007 |
| WO | 2008007884 | 1/2008 |

OTHER PUBLICATIONS

"Reconfigurable Optical Add-Drop Multiplexer," Wikipedia web page http://en.wikipedia.org/wiki/Reconfigurable_optical_add-drop_multiplexer, Oct. 13, 2008, 1 page.

"Passive Optical Network," Wikipedia web page http://en.wikipedia.org/wiki/Passive_optical_network, Oct. 14, 2008, 7 pages.

Cioffi et al., "CuPon: The Copper Alternative to PON 100 Gb/s DSL Networks," IEEE Communications Magazine, Jun. 2007, 8 pages.

"Dynamic Spectrum Management (DSM): Level 3—Vectoring for multi-100 Mbps DSLs, Birds of a Feather Session," DSL Forum, Speaker John M. Cioffi, Aug. 28, 2007, 18 pages.

James Blanc, Pedestal Networks, Inc., "Line Powering in the Remote DSLAM World," CommsDesign, Dec. 7, 2004, 9 pages.

"Optical add-drop multiplexer," Wikipedia web page http://en.wikipedia.org/wiki/Optical_add-drop_multiplexer, Jan. 31, 2008, 2 pages.

Extending Asymmetric Digital Subscriber Line (ADSL) Services to Remote Digital Loop Carrier (DLC) Locations, Web ProForums, web page http://www.iec.org/online/tutorials/adsl_dlc/topic04.html, Copyright 2007, printed Oct. 15, 2008, 2 pages.

"Fiber to the X," Wikipedia web page http://en.wikipedia.org/wiki/Fiber_to_the_x, Oct. 14, 2008, 8 pages.

United States Patent and Trademark Office, "Non-Final Office Action", issued in connection with U.S. Appl. No. 12/511,795, dated Feb. 15, 2012 (8 pages).

United States Patent and Trademark Office, "Final Office Action", issued in connection with U.S. Appl. No. 12/511,795, dated Jun. 12, 2012 (10 pages).

United States Patent and Trademark Office, "Advisory Action", issued in connection with U.S. Appl. No. 12/511,795, dated Oct. 19, 2012 (3 pages).

United States Patent and Trademark Office, "Advisory Action", issued in connection with U.S. Appl. No. 12/511,795, dated Nov. 5, 2012 (3 pages).

* cited by examiner

FIG. 1
(PRIOR ART)

FIG. 2
*ENABLING SELECTIVE UPGRADING OF SUBSCRIBER LINES*

FIG. 3
*SELECTIVELY UPGRADED SUBSCRIBER LINE*

METHODS AND APPARATUS TO UPGRADE COMMUNICATION SERVICES IN SUBSCRIBER DISTRIBUTION AREAS

RELATED APPLICATIONS

This patent arises from a continuation of U.S. patent application Ser. No. 12/511,795, filed on Jul. 29, 2009, which is hereby incorporated by reference herein in its entirety.

FIELD OF THE DISCLOSURE

The present disclosure relates generally to communication systems and, more particularly, to methods and apparatus to upgrade communication services in subscriber distribution areas.

BACKGROUND

Optical fiber technologies are often used in communication systems to provide high data rate communication services to subscriber premises. When new areas are under development for residential housing or businesses, a communication company and/or service provider installs optical fibers between a service provider network (e.g., a central office (CO), a remote terminal (RT), a serving area interface (SAI), etc.) and all the residential houses or business premises built in the newly developed area to enable delivery of high data rate services (e.g., services requiring data rates greater than 100 megabits per second (Mbps)). In such developments, the communication company and/or service provider effectively installs fiber-to-the-premises (FTTP) distribution lines to each subscriber premises regardless of whether the subscribers of those subscriber premises are interested in ordering services requiring higher data rates afforded by the installed optical fiber transmission media.

DETAILED DESCRIPTION OF THE DRAWINGS

The example methods and apparatus described herein can be used to enable upgrading communication services in a subscriber distribution area by selectively upgrading transmission media of local loops or subscriber lines to individual subscriber premises. The example methods and apparatus enable gradually and cost effectively migrating service subscriber distribution systems from fiber-to-the-curb (FTTC) to fiber-to-the-premises (FTTP) in brownfield serving areas.

In the illustrated examples described herein, upgrading transmission media of local loops or subscriber lines involves replacing or supplementing an existing electrically conductive medium extending from a pedestal location to a subscriber premises with an optical fiber transmission medium while not upgrading subscriber lines of neighboring premises to optical fiber when high data rate services requiring optical fiber have not been requested or ordered by subscribers at those neighboring subscriber premises. In this manner, in established subscriber distribution areas such as residential neighborhoods, office parks, or industrial parks already having legacy electrically conductive transmission media (e.g., copper-based wires or cables such as twisted pair wires or coaxial cables) to provide individual subscriber premises with communication services, a communication service provider need not make a large initial expenditure to convert or upgrade every existing electrically conductive transmission medium to an optical transmission medium for every subscriber premises in the subscriber distribution area. Instead, a communication service provider can install future-upgrade enabling technologies that enable continued delivery of communication services to subscriber premises via existing legacy electrically conductive transmission media while facilitating selectively upgrading transmission media for individual subscriber premises without having to also simultaneously upgrade transmission media of neighboring subscriber premises.

The example methods and apparatus described herein can be advantageously used in brownfield serving areas, which are subscriber distribution areas such as neighborhoods that are well established and that have existing legacy transmission media (e.g., copper-based wires or cables) installed throughout. Providing upgraded communication services to higher data rates that exceed the copper-based Ethernet data rate limit (e.g., 100 Mbps) in such brownfield serving areas can be costly and difficult due to the necessary amount of digging through and/or disturbance on subscribers' private properties to upgrade the existing distribution infrastructure. For instance, in many established neighborhoods, electrically conductive (e.g., copper) subscriber lines are often installed underground extending from pedestals at or near curb or parkway locations to subscribers' dwellings or buildings. Replacing or supplementing a legacy subscriber line with an optical fiber line to enable providing higher data rate services or expanded service features involves digging up a subscriber's property (e.g., the subscriber's front lawn or backyard). This process results in high expenditures for the communication service provider company and may also result in expenditures for the subscribers associated with property maintenance or repair. The example methods and apparatus described herein enable service providers to perform relatively more economical outside plant upgrades, especially for such brownfield serving areas, by targeting upgrades to only subscribers that require, subscribe to, or request the associated higher bandwidths.

By installing future-upgrade enabling systems in subscriber distribution areas that support existing legacy transmission media as described herein, a communication service provider company can gradually upgrade communication services in a subscriber distribution area (e.g., on an individual basis to subscribers that are ready and willing to undertake this process of replacing or supplementing existing transmission media on their properties). In addition, the communication service provider company need not make a higher initial investment to upgrade transmission media to every subscriber premises in a subscriber distribution area all at once. This is significant when many subscribers may not even be interested in taking advantage of upgraded services enabled by the upgraded transmission media (e.g., many subscribers may keep existing communication services that could be provided via legacy transmission media).

As described in greater detail below, the example techniques described herein can be implemented by installing an optical line terminal (OLT) at a CO or an RT to serve a subscriber distribution area (e.g., a residential neighborhood, an office park, an industrial park, etc.) and installing optical network units (ONUs) at pedestal locations (e.g., curb or parkway locations) in the subscriber distribution area communicatively coupled to the OLT. In some example implementations, an ONU may include a subscriber downlink interface to serve a subscriber premises (e.g., a subscriber household) and another subscriber downlink interface to serve an adjacent or neighboring subscriber premises. Initially, when neither subscriber has ordered or subscribed to communication services requiring upgraded transmission medium drops to their dwellings or building, communication services are provided to both subscriber premises via respective, legacy or existing electrically conductive media communicatively coupled to respective ones of the subscriber downlink interfaces via removably attachable subscriber downlink modules connected to or inserted into the subscriber downlink interfaces. When one of the subscribers requests an upgraded communication service, a communication service provider company can, in response, replace a corresponding removably attachable subscriber downlink module with a removably attachable subscriber downlink module configured to communicate over an optical fiber medium and extend an optical transmission medium between the newly provided removably attachable subscriber downlink module and the subscriber premises without needing to upgrade the existing transmission media for neighboring subscriber premises. This example process is described in detail below in connection with FIGS. 1-3.

Figure 1:
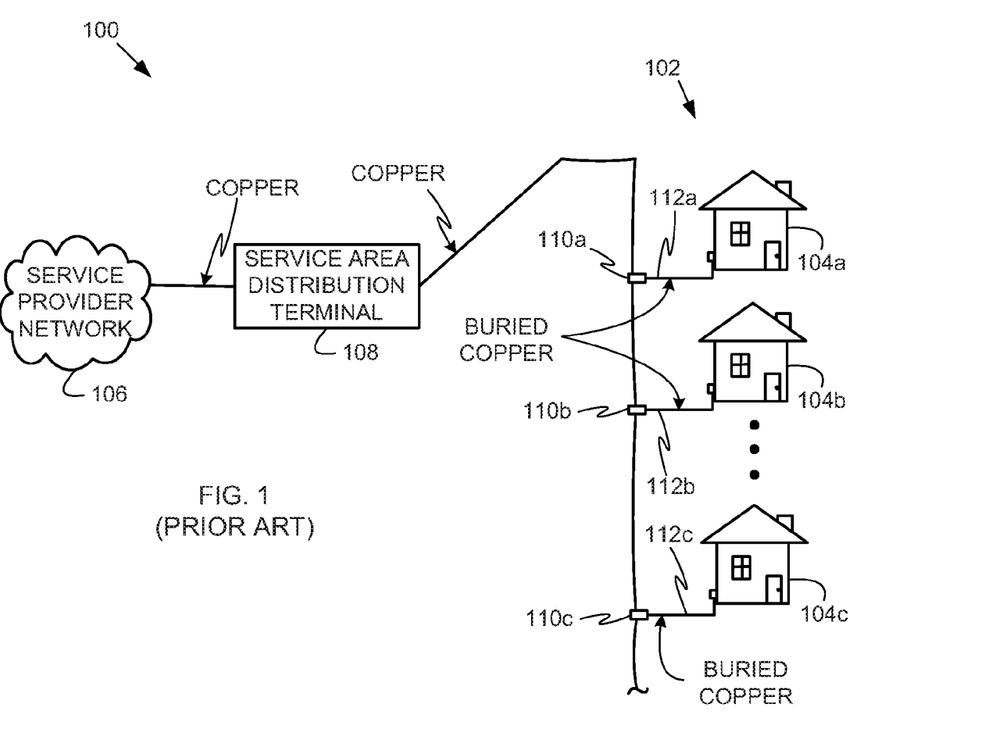
FIG. 1 depicts a traditional communication services distribution system having electrically conductive transmission media extended throughout a subscriber distribution area.

Turning now to FIG. 1, a traditional communication services distribution system 100 having electrically conductive transmission media extended throughout a subscriber distribution area 102 is shown. In the illustrated example, the subscriber distribution area 102 is a residential neighborhood having subscriber premises or households 104a-c. The communication services distribution system 100 can be configured to provide telephone services, Internet access services, video services, or any other types of communication/data transmission services to the subscriber distribution area 102 from a service provider network 106. The service provider network 106 can be owned and/or operated by a telephone company, a cable company, etc. that offers one or more communication/data transmission services.

The communication services distribution system 100 of FIG. 1 is implemented using electrically conductive transmission media extended between the service provider network 106 and the subscriber premises 104a-c. In the illustrated example, the electrically conductive transmission media are implemented using copper wires or cables that extend from a service area distribution terminal 108 (e.g., a remote terminal) to each of a plurality of curb terminal boxes 110a-c. In the illustrated example, each of the curb terminal boxes 110a-c serves a respective one of the subscriber premises 104a-c via a respective one of a plurality of local loops or subscriber lines 112a-c, which are implemented using buried electrically conductive transmission media (e.g., buried copper cables such as twisted pair wires or coaxial cables) to connect to customer equipment. The material properties and lengths of electrically conductive transmission media directly affect their capability for communicating at higher data rates. For instance, in the illustrated example, the physical layer of the subscriber lines 112a-c is Ethernet or digital subscriber line (DSL), which impose a 100 Mbps data rate limit over copper transmission media. Thus, the communication/data transmission services that can be provided to the subscriber premises 104a-c are limited by the data rates that can be carried by the electrically conductive transmission media of the subscriber lines 112a-c. To enable providing services requiring higher data rate communications or to provide a higher quality of service, it is often necessary to upgrade (e.g., replace or supplement) electrically conductive transmission media with transmission media having lower signal attenuation properties and, thus, higher data rate transmission capabilities. Such transmission media includes optical fiber transmission media. As discussed below, transmission media of subscriber lines in a subscriber distribution area can be upgraded in a phased, gradual, or selective manner in accordance with the example methods and apparatus described herein to facilitate selectively upgrading communication services to individual subscriber premises on an as-needed or as-ordered basis.

Figure 2:
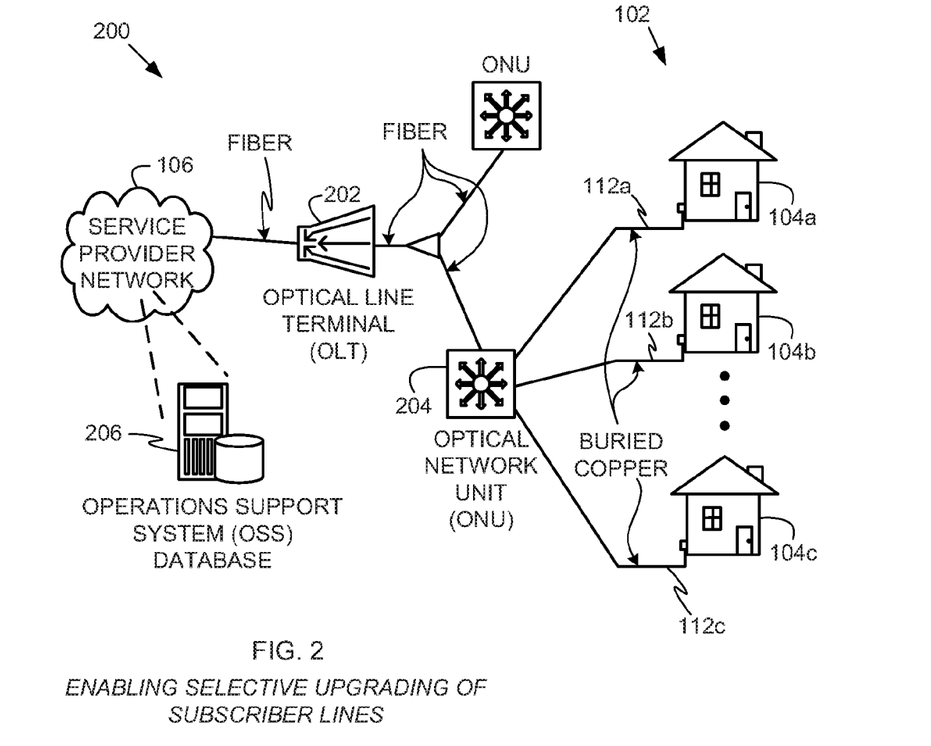
FIG. 2 is an example communication services distribution system that can be implemented in accordance with the example methods and apparatus described herein to enable selectively upgrading transmission media to individual subscriber premises.

FIG. 2 is an example communication services distribution system 200 that can be implemented in accordance with the example methods and apparatus described herein to enable selectively upgrading transmission media to individual subscriber premises (e.g., the subscriber premises 104a-c). In the illustrated example, to enable the subscriber distribution area 102 for selectively upgrading transmission media for individual subscriber premises, an optical line terminal (OLT) 202 that is communicatively coupled to the service provider network 106 via optical fiber transmission media is installed at a CO or RT to replace the service area distribution terminal 108 (FIG. 1). In addition, the curb terminal boxes 110a-c of FIG. 1 are replaced with an optical network unit (ONU) 204 installed at, for example, a curb pedestal location. The OLT 202 is also communicatively coupled to the ONU 204 corresponding to the subscriber distribution area 102 via optical fiber transmission media creating a fiber-to-the-curb (FTTC) distribution. The OLT 202 and the ONU 204 can be used to implement a gigabit-capable passive optical network (GPON), a point-to-point fiber network, or any other type of communication network. In the illustrated example, one ONU serves several (typically 4 to 12) subscriber premises (e.g., the subscriber premises 104a-c). In other example implementations, separate ONUs can be installed, each of which serves a single, respective subscriber premises.

In some example implementations, the optical fiber installed to communicatively couple the OLT 202 to the ONU 204 can completely replace existing electrically conductive transmission media, while in other example implementations, the electrically conductive transmission media can remain in place to supplement the optical fiber to deliver, for example, electrical power to the ONU 204 at a pedestal that serves the subscriber premises 104a-c. In any case, when the subscriber distribution area 102 is initially enabled for selectively upgrading individual subscriber premises to optical fiber-based services but no subscriber has yet requested or ordered such services, the existing buried electrically conductive medium (e.g., copper wire) used to implement the subscriber lines 112a-c connecting to customer equipment at the subscriber premises 104a-c is kept in place and communicatively coupled to the ONU 204. The ONU 204 is configured to adaptively deliver communication services via electrically conductive transmission media and/or optical fiber transmission media. In this manner, when upgraded communication services are requested or ordered for a particular one of the subscriber premises 104a-c, the existing electrically conductive transmission medium used to implement a corresponding one of the subscriber lines 112a-c can be replaced by an optical fiber transmission medium on a corresponding interface (e.g., a port, a connector, etc.) of the ONU 204 to implement a fiber-to-the-premises (FTTP) subscriber line.

Figure 3:
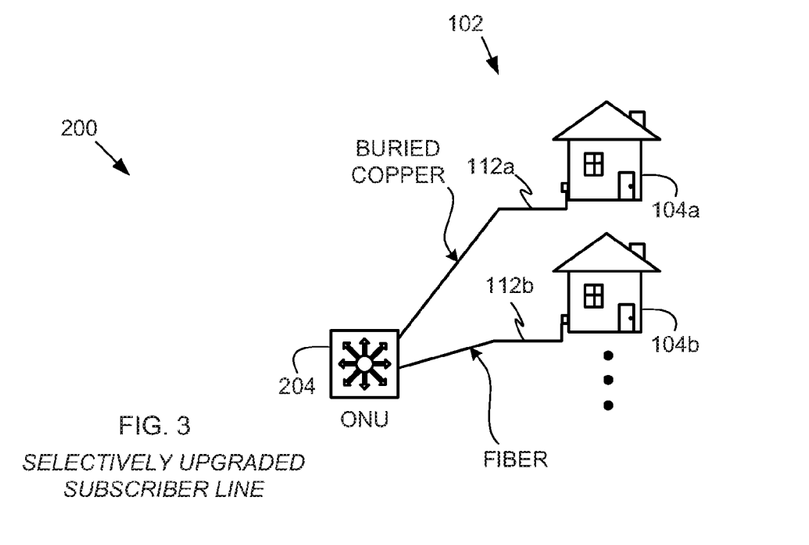
FIG. 3 depicts a portion of the example communication services distribution system of FIG. 2 showing a selectively upgraded subscriber premises.

An example selectively upgraded FTTP distribution is shown in FIG. 3. In particular, FIG. 3 depicts a portion of the example communication services distribution system 200 of FIG. 2 in which the subscriber line 112b to the subscriber premises 104b has been selectively upgraded to an optical fiber transmission medium while maintaining services to the subscriber premises 104a via an existing electrically conductive transmission medium 112a.

Referring back to FIG. 2, an operations support system (OSS) database 206 in the service provider network 106 is provided to enable a service provider to track or maintain status records indicating subscriber distribution areas (e.g., the subscriber distribution area 102) and/or individual subscriber premises (e.g., the subscriber premises 104a-c) that have been enabled for selective upgrading to optical fiber transmission media and to keep status records indicating which individual subscriber premises have already been upgraded to optical fiber transmission media. In this manner, when a subscriber orders (or attempts to order) communication/data transmission services requiring higher bandwidth capabilities (e.g., greater than 100 megabits-per-second (Mbps) as provided by optical fiber transmission media), the service provider can check status records in the OSS database 206 to determine whether the subscriber premises of that subscriber already has an optical fiber transmission media subscriber line installation from an ONU (e.g., the ONU 104) or whether the subscriber premises is enabled for installing an optical fiber transmission medium to a respective ONU. An example subscriber profiles data structure that can be stored in the OSS database 206 to track or maintain the above-described status records to indicate upgradeable and upgraded subscriber lines in a subscriber distribution area is described below in connection with FIG. 5.

Figure 4:
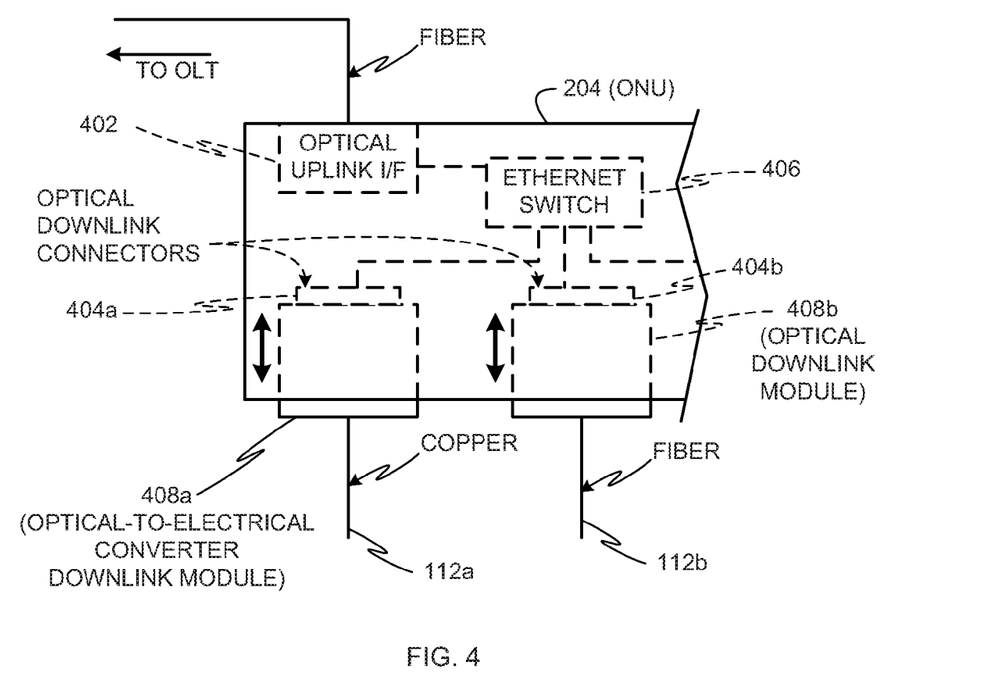
FIG. 4 depicts an example optical network unit that can be used to provide communication services to subscriber premises via electrically conductive or optical transmission media.

FIG. 4 depicts the example ONU 204 of FIGS. 2 and 3 that can be used to provide communication services to subscriber premises (e.g., the subscriber premises 104a-c of FIGS. 1-3) via electrically conductive or optical fiber transmission media. In the illustrated example, the ONU 204 is provided with an optical uplink interface 402 and optical downlink connectors (or interfaces) 404a and 404b. The optical uplink interface 402 is provided to connect the ONU 204 to the OLT 202 (FIG. 2) via optical fiber. The optical downlink connectors 404a-b are provided to connect the ONU 204 to respective subscriber premises (e.g., the subscriber premises 104a-c of FIGS. 1-3). Although two optical downlink connectors 404a-b are shown, the ONU 204 may be provided with any number of optical downlink connectors to serve one or more subscriber premises. The ONU 204 is also provided with an Ethernet switch 406 to deliver information between the optical uplink interface 402 and the optical downlink connectors 404a-b. In the illustrated example, the Ethernet switch 406 can be implemented using an optical Ethernet switch to enable transferring information in optical form within the ONU 204. In the illustrated example, the Ethernet switch 406 is provided with identifiers (e.g., customer identifiers, media access control (MAC) addresses, port identifiers, etc.) corresponding to the different subscriber premises served by the ONU 204 to enable transmitting respective information to each subscriber premises.

Each of the optical downlink connectors 404a-b is configured to interchangeably receive an optical-to-electrical converter downlink module and an optical downlink module. In the illustrated example, the optical downlink connector 404a is shown as having an optical-to-electrical converter downlink module 408a removably connected thereto, and the optical downlink connector 404b is shown as having an optical downlink module 408b removably connected thereto. In the illustrated example, the downlink modules 408a and 408b are single-port pluggable modules. In the illustrated example, an electrically conductive medium (e.g., copper) extending from the optical-to-electrical converter downlink module 408a implements the subscriber line 112a as shown in FIG. 3, and an optical fiber medium extending from the optical downlink module 408b implements the subscriber line 112b as shown in FIG. 3.

As discussed above in connection with FIG. 2, when the service distribution area 102 is initially converted to a FTTC distribution configuration in which an optical fiber transmission medium is extended between the service provider network 106 and the ONU 204, there may be no demand for upgraded communication/data transmission services that would require upgrading subscriber line drops from the ONU 204 to subscriber premises with optical fiber. The ONU 204 depicted in FIG. 4 enables a service provider to continue delivering services to the subscriber premises 104a-c using the existing electrically conductive transmission medium to those premises by connecting optical-to-electrical converter downlink modules (e.g., the optical-to-electrical converter downlink module 408a) in all of the optical downlink connectors (e.g., the optical downlink connectors 404a-b) of the ONU 204. In this manner, optical-to-electrical converter downlink modules can convert information between optical and electrical formats to enable maintaining electrical conductor-based services to the subscriber premises 104a-c even though the communication services distribution system 200 is upgraded to an optical fiber-based system (i.e., a FTTC system).

As time passes and a subscriber orders upgraded communication/data transmission services requiring an optical fiber subscriber line drop to the subscriber premises, the ONU 204 facilitates upgrading the subscriber line to the subscriber premises with an optical fiber transmission medium. For example, referring to FIG. 4, a field technician can remove the optical-to-electrical converter downlink module 408a from the optical downlink connector 404a and replace it with an optical downlink module substantially similar or identical to the optical downlink module 408b. The field technician would also extend (e.g., bury) an optical fiber between the newly installed optical downlink module and the subscriber premises.

The ONU 204 can be provided with user interface features to assist field technicians in the upgrade process. For example, the ONU 204 may be provided with visible or audible alarm or notification capabilities to alert a field technician when a downlink module (e.g., the downlink modules 408a-b) is inserted incorrectly. The ONU 204 may also be provided with visible or audible notification capabilities to notify a field technician when the type of downlink module inserted into an optical interface (e.g., the optical interfaces 404a-b) is incorrect based on a service status or indicator in the OSS database 206 for a respective subscriber. For example, if a subscriber has not ordered services requiring upgraded capabilities, the subscriber's profile in the OSS database 206 will indicate that the subscriber does not require an optical fiber subscriber line.

Figure 5:
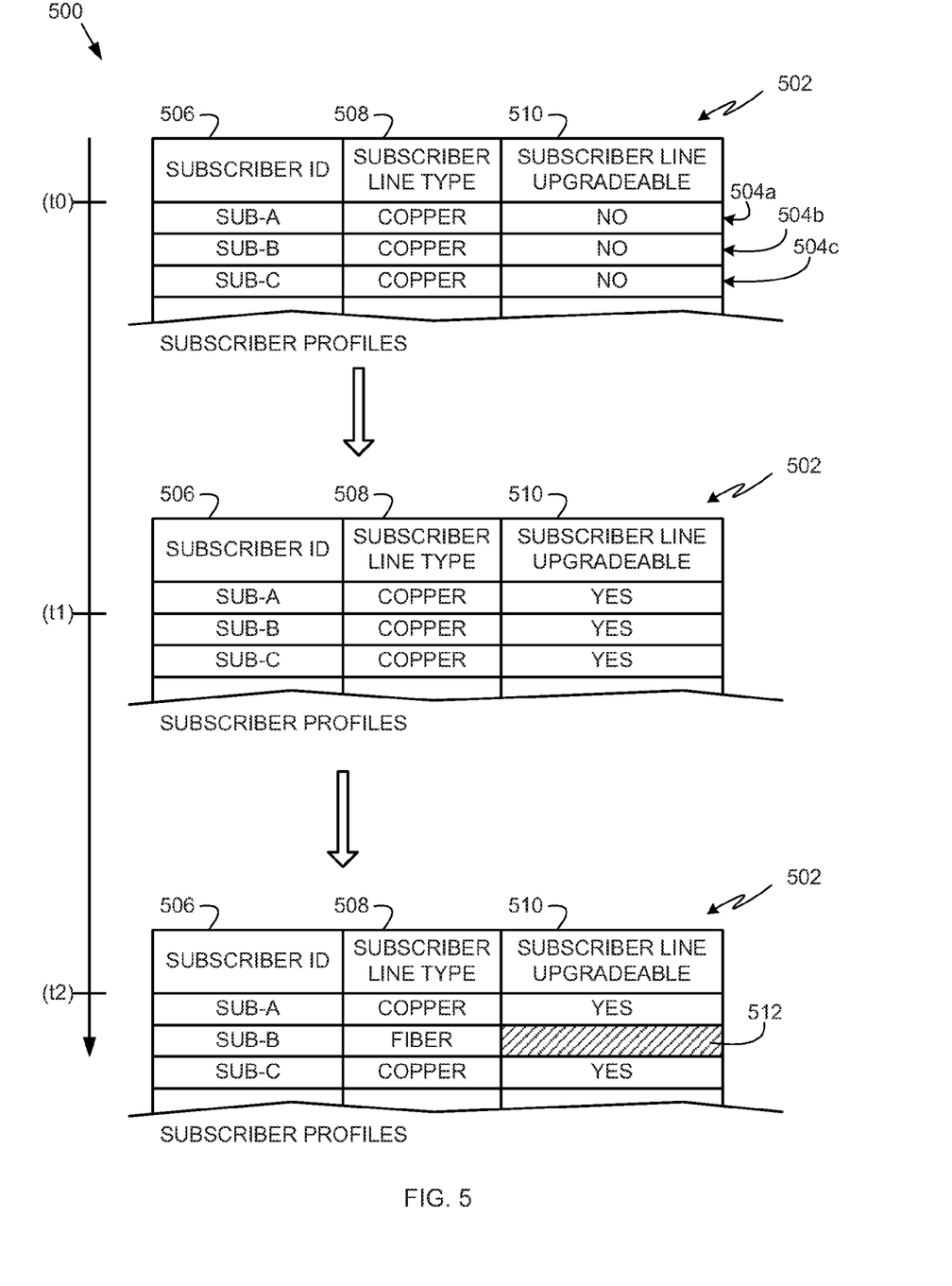
FIG. 5 depicts an example process of updating an example subscriber profiles data structure to indicate upgradeable and upgraded subscriber lines in a subscriber distribution area.

FIG. 5 depicts an example process 500 of updating an example subscriber profiles data structure 502 to indicate upgradeable and upgraded subscriber lines (e.g., the subscriber lines 112a-c of FIGS. 1-3) in a subscriber distribution area (e.g., the subscriber distribution area 102 of FIGS. 1-3). The example subscriber profiles data structure 502 can be stored in the OSS database 206 of FIG. 2 and includes a plurality of subscriber profile record entries 504a-c, each of which corresponds to a respective subscriber or subscriber premises (e.g., the subscriber premises 104a-c of FIGS. 1-3). To track subscriber line types and subscriber line upgradeabilities of different subscriber premises, the subscriber profiles data structure 502 is provided with a subscriber identifier (ID) column 506, a subscriber line type column 508, and a subscriber line upgradeable column 510. In the subscriber ID column 506, identifiers indicative of respective ones of the subscriber premises 104a-c are stored. In the subscriber line type column 508, information indicative of the type of transmission media installed for respective subscriber lines is stored. In the subscriber line upgradeable column 510, information indicating whether corresponding subscriber premises are enabled for having their subscriber lines upgraded to optical fiber is stored.

The subscriber profiles data structure 502 is shown in a time progression process at times (t0), (t1), and (t2) during which the subscriber profile record entries 504a-c are updated to reflect different stages of the optical fiber upgrade processes discussed above in connection with FIGS. 2-4. Initially, the subscriber profiles data structure 502 as shown at time (t0) indicates that all of the subscriber lines 112a-c of the subscriber premises 104a-c are provided using electrically conductive transmission media (e.g., copper) and that none of the subscriber lines 112a-c are upgradeable to optical fiber. In the illustrated example, the subscriber profiles data structure 502 as shown at time (t0) is representative of what the OSS database 206 (FIG. 2) would store for the subscriber distribution area 102 shown in FIG. 1 when a FTTC configuration using the OLT 202 and the ONU 204 has not been implemented.

After a FTTC configuration using the OLT 202 and the ONU 204 has been implemented for the subscriber distribution area 102 as described above in connection with FIG. 2, the subscriber profiles data structure 502 can be updated as shown at time (t1) to indicate that all of the subscriber lines 112a-c of the subscriber premises 104a-c are provided using electrically conductive transmission media (e.g., copper) and that all of the subscriber lines 112a-c are upgradeable to optical fiber.

After upgrading the subscriber line 112b of the subscriber premises 104b as described above in connection with FIG. 4, the subscriber profiles data structure 502 can be updated as shown at time (t2) to indicate that the subscriber line 112b of the subscriber premises 104b is provided using optical fiber, while continuing to provide the subscriber lines 112a and 112c of neighboring subscriber premises 104a and 104c using electrically conductive transmission media. In the illustrated example, a subscriber line upgradeable entry 512 corresponding to the subscriber premises 104b is disabled or indicated as not applicable because the corresponding subscriber line 112b is already upgraded. Other subscriber profile record entries of the subscriber profiles data structure 502 can be updated in similar fashion when other subscriber lines of other subscriber premises are upgraded.

Figure 6:
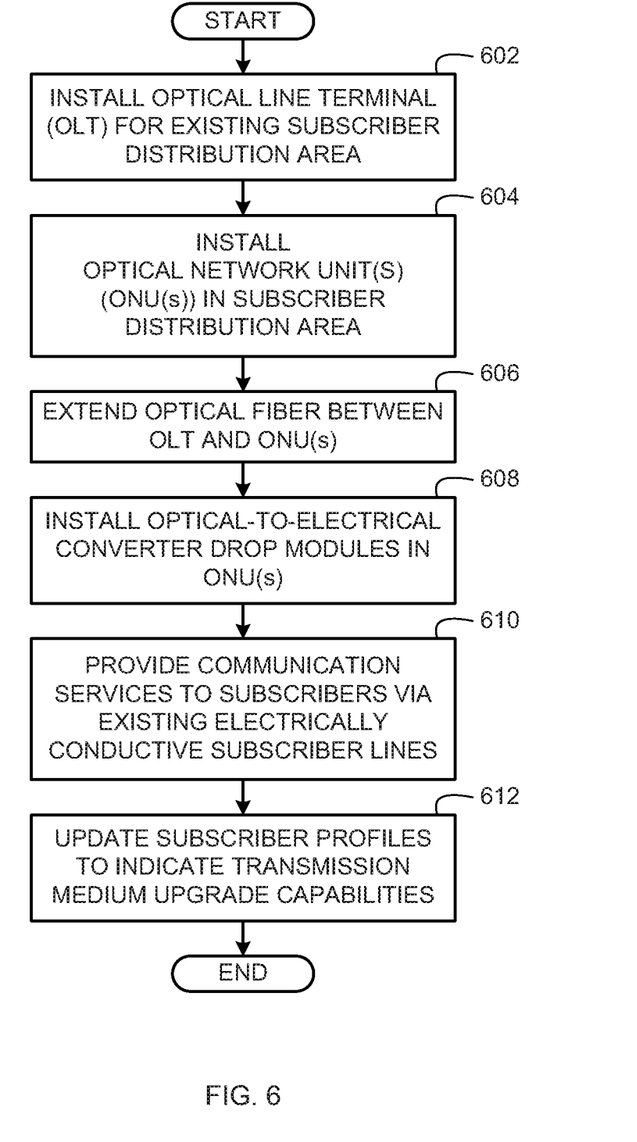
FIG. 6 is a flow diagram of an example process that can be used to provide a subscriber distribution area for selectively upgrading transmission media to individual subscriber premises.
Figure 7:
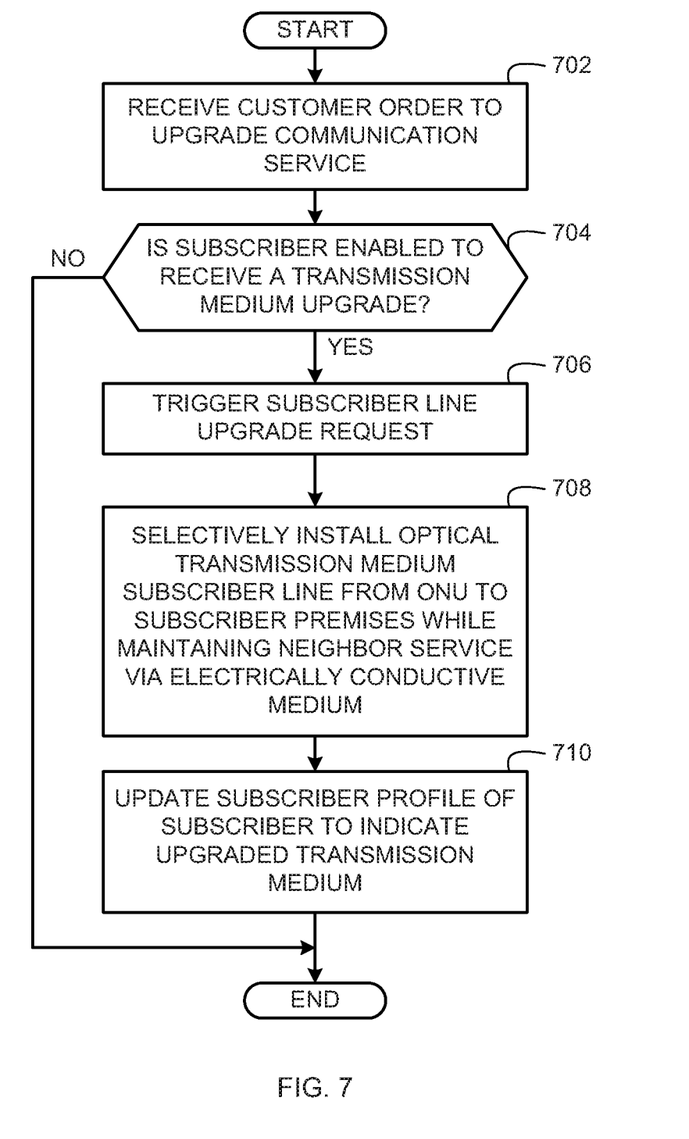
FIG. 7 is a flow diagram of an example process to selectively upgrade transmission media to individual subscriber premises.

FIG. 6 is a flow diagram of an example process that can be used to enable a subscriber distribution area for selectively upgrading transmission media to individual subscriber premises. FIG. 7 is a flow diagram of an example process to selectively upgrade transmission media to individual subscriber premises. One or more operations of the example processes of FIGS. 6 and 7 may be performed using a processor, a controller, and/or any other suitable processing device. For example, one or more of the operations of the example processes of FIGS. 6 and 7 may be implemented in coded instructions stored on a tangible medium such as a flash memory, a read-only memory (ROM), and/or a random-access memory (RAM) associated with a processor (e.g., the example processor 812 discussed below in connection with FIG. 8). Alternatively, one or more of the operations of the example process of FIG. 6 or the example process of FIG. 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations of the example process of FIG. 6 or the example process of FIG. 7 may be implemented manually or as any combination(s) of any of the foregoing techniques, for example, any combination of firmware, software, discrete logic and/or hardware. Further, although the example processes of FIGS. 6 and 7 are described with reference to the flow diagrams of FIGS. 6 and 7, other methods of implementing the processes of FIGS. 6 and 7 may be employed. For example, the order of execution of the blocks may be changed, and/or some of the blocks described may be changed, eliminated, sub-divided, or combined. Additionally, one or both of the example processes of FIGS. 6 and 7 may be performed sequentially and/or in parallel by, for example, separate processing threads, processors, devices, discrete logic, circuits, etc.

Turning to FIG. 6, the depicted example process can be implemented by one or more field technicians or installation specialists of a service provider to convert the communication services distribution system 100 of FIG. 1 to a FTTC system such as the communication services distribution system 200 that enables subsequently selectively upgrading transmission media of subscriber lines (e.g., the subscriber lines 112a-c of FIGS. 1-3) to individual subscriber premises (e.g., the subscriber premises 104a-c). The example process is described by way of example in connection with the distribution systems discussed above in connection with FIGS. 1-3. Initially, a service provider installs the OLT 202 (FIG. 2) for the existing subscriber distribution area 102 (FIGS. 1 and 2) (block 602) and installs one or more ONU(s) in the subscriber distribution area 102 (block 604). The ONU(s) may be substantially similar or identical to the ONU 204 of FIGS. 2-4 and may be installed at curb pedestal locations. The service provider then extends optical fiber between the OLT 202 and the ONU(s) (block 606).

A field technician then installs (e.g., inserts) optical-to-electrical converter downlink modules in the ONU(s) (block 608). In the illustrated example, the optical-to-electrical converter downlink modules are substantially similar or identical to the optical-to-electrical converter downlink module described above in connection with FIG. 4. The service provider continues to provide communication/data transmission services to existing subscriber premises (e.g., the subscriber premises 104a-c of FIGS. 1-3) using existing electrically conductive transmission media of subscriber lines (e.g., the subscriber lines 112a-c of FIGS. 1-3) (block 610). The service provider updates respective subscriber profiles associated with the subscriber distribution area 102 to indicate that associated subscriber premises (e.g., the subscriber premises 104a-c) are enabled for upgrading transmission medium of corresponding subscriber lines (e.g., the subscriber lines 112a-c of FIGS. 1-3) (block 612). For example, the service provider can use the OSS database 206 of FIG. 2 to update the subscriber profile record entries 504a-c of the subscriber profiles data structure 502 as discussed above in connection with time (t1) of FIG. 5. The example process of FIG. 6 then ends. In some example implementations, at any time before, during, or after the process of FIG. 6, a subscriber may be contacted and offered an upgraded service. If a subscriber accepts the upgraded service offer, the process of FIG. 7 may be performed at block 608.

Turning now to FIG. 7, the example process may be used to selectively upgrade a transmission medium of a subscriber line (e.g., one of the subscriber lines 112a-c of FIGS. 1-3) to an individual subscriber premises (e.g., a corresponding one of the subscriber premises 104a-c of FIGS. 1-3). Initially, a service provider receives a customer order from a subscriber (e.g., one of the subscriber premises 104a-c) to upgrade a communication service to that subscriber (block 702) to a bandwidth that exceeds the bandwidth limit of copper-based Ethernet (e.g., 100 Mbps). In the illustrated example, the upgraded service requires upgrading the transmission medium of a corresponding subscriber line to enable higher data rate capabilities. For example, the service provider can determine that the requested bandwidth upgrade exceeds the bandwidth limit (e.g., 100 Mbps) of an existing copper subscriber line drop and that an optical fiber subscriber line drop to the subscriber premises would be needed to provide the requested bandwidth upgrade.

The service provider determines whether subscriber premises corresponding to the customer order of block 702 is enabled to receive a transmission medium upgrade (block 704). For example, the service provider can use the OSS database 206 (FIG. 2) to determine whether a corresponding subscriber profile (e.g., one of the subscriber profile record entries 504a-c of FIG. 5) indicates that the subscriber premises corresponding to the customer order has been enabled for selectively upgrading to an optical fiber transmission medium subscriber line. For example, as discussed above in connection with FIG. 5, a subscriber profile entry corresponding to the subscriber line upgradeable column 510 can be retrieved from the OSS database 206 to determine which subscriber premises are enabled for subscriber line upgrades.

If the service provider determines at block 704 that the subscriber premises corresponding to the customer order of block 702 is enabled to receive a transmission medium upgrade, the OSS database 206 triggers a subscriber line upgrade request (block 706). One or more field technicians then selectively install an optical fiber transmission medium for the subscriber line associated with the customer order from a respective ONU to a corresponding subscriber premises while maintaining delivery of a neighboring subscriber service via an existing electrically conductive transmission medium (block 708). For example, referring to FIGS. 3 and 4, if the customer order is associated with the subscriber premises 112b (FIG. 3), an optical-to-electrical converter downlink module connected to the optical downlink connector 404b (FIG. 4) is removed and replaced with the optical downlink module 408b (FIG. 4). An optical fiber is then connected to the optical downlink module 408b. The optical fiber extends between the ONU 204 and the subscriber premises 112b as shown in FIG. 3. In some example implementations, the optical fiber may be pre-existing (e.g., from a prior subscriber) or may be newly installed (e.g., if this is the first instance of delivering fiber-based service to the subscriber premises).

If applicable, the service provider updates the subscriber profile of the upgraded subscriber to indicate that the transmission medium of the subscriber line was upgraded (block 710). In this manner, future customer orders associated with higher bandwidth requirements will not trigger a request to upgrade the subscriber line transmission medium, but will only cause replacing the corresponding downlink module and connecting the desired transmission medium to the new module. After updating the subscriber profile at block 710 or if the service provider determines at block 704 that the subscriber premises corresponding to the customer order of block 702 is not enabled to receive a transmission medium upgrade, the example process of FIG. 7 is ended.

Figure 8:
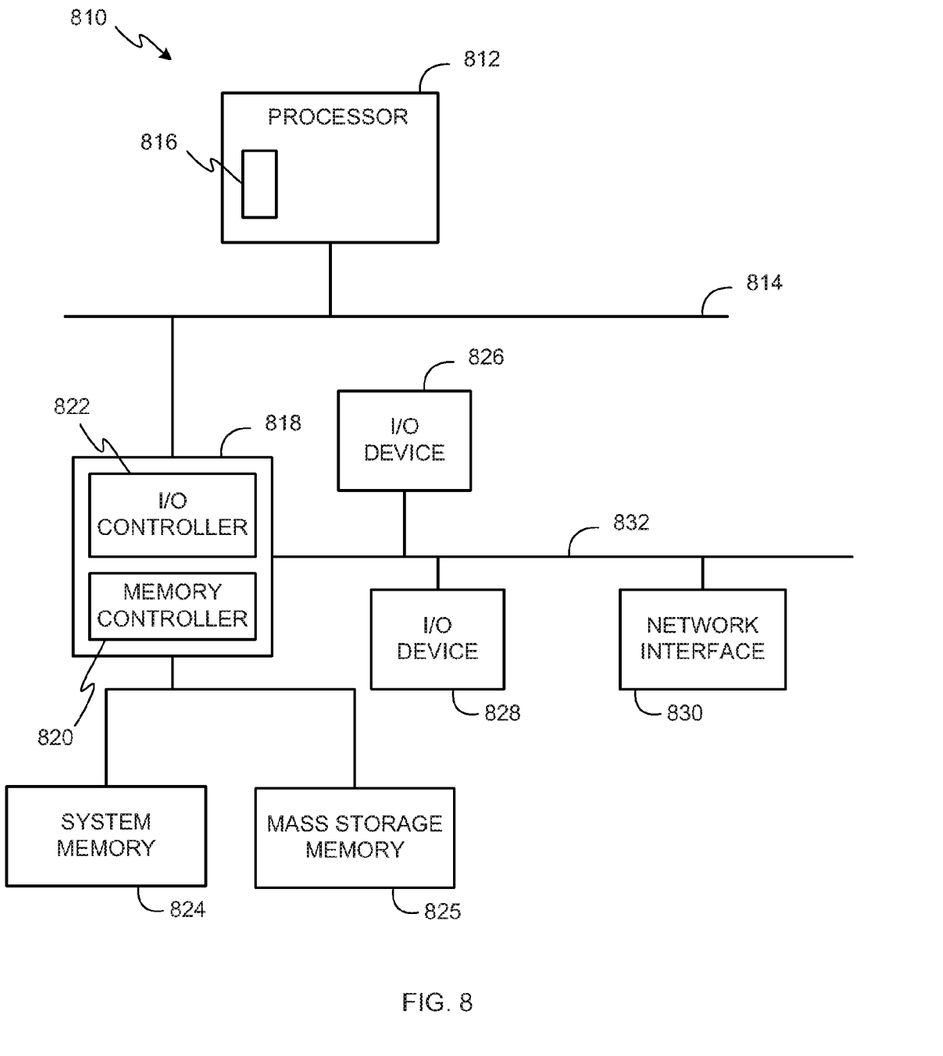
FIG. 8 is an example processor system that can be used to implement the example methods and apparatus disclosed herein.

FIG. 8 is a block diagram of an example processor system 810 that may be used to implement the example apparatus, methods, and articles of manufacture described herein. For example, processor systems substantially similar or identical to the example processor system 810 may be used to implement the OSS database 206 or any other component in the service provider network 106 and/or the communication services distribution system 200 of FIGS. 2 and 3.

As shown in FIG. 8, the processor system 810 includes a processor 812 that is coupled to an interconnection bus 814. The processor 812 may be any suitable processor, processing unit, or microprocessor. Although not shown in FIG. 8, the system 810 may be a multi-processor system and, thus, may include one or more additional processors that are identical or similar to the processor 812 and that are communicatively coupled to the interconnection bus 814.

The processor 812 of FIG. 8 is coupled to a chipset 818, which includes a memory controller 820 and an input/output (I/O) controller 822. A chipset provides I/O and memory management functions as well as a plurality of general purpose and/or special purpose registers, timers, etc. that are accessible or used by one or more processors coupled to the chipset 818. The memory controller 820 performs functions that enable the processor 812 (or processors if there are multiple processors) to access a system memory 824 and a mass storage memory 825.

In general, the system memory 824 may include any desired type of volatile and/or non-volatile memory such as, for example, static random access memory (SRAM), dynamic random access memory (DRAM), flash memory, read-only memory (ROM), etc. The mass storage memory 825 may include any desired type of mass storage device including hard disk drives, optical drives, tape storage devices, etc.

The I/O controller 822 performs functions that enable the processor 812 to communicate with peripheral input/output (I/O) devices 826 and 828 and a network interface 830 via an I/O bus 832. The I/O devices 826 and 828 may be any desired type of I/O device such as, for example, a keyboard, a video display or monitor, a mouse, etc. The network interface 830 may be, for example, an Ethernet device, an asynchronous transfer mode (ATM) device, an 802.11 device, a digital subscriber line (DSL) modem, a cable modem, a cellular modem, etc. that enables the processor system 810 to communicate with another processor system.

While the memory controller 820 and the I/O controller 822 are depicted in FIG. 8 as separate functional blocks within the chipset 818, the functions performed by these blocks may be integrated within a single semiconductor circuit or may be implemented using two or more separate integrated circuits.

Of course, the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above-described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and/or other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible medium, such as: a magnetic medium (e.g., a disk or tape); a magneto-optical or optical medium such as a disk; or a solid state medium such as a memory card or other package that houses one or more read-only (non-volatile) memories, random access memories, or other re-writeable (volatile) memories. Accordingly, the example software and/or firmware described herein can be stored on a tangible medium such as those described above or equivalents and successor media.

To the extent the above specification describes example components and functions with reference to particular devices, standards and/or protocols, it is understood that the teachings of the invention are not limited to such devices, standards and/or protocols. Such devices are periodically superseded by different, faster, and/or more efficient systems having the same general purpose. Accordingly, replacement devices, standards and/or protocols having the same general functions are equivalents which are intended to be included within the scope of the accompanying claims.

Further, although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method of upgrading communication services in a subscriber distribution area, the method comprising:
when a first electrically conductive medium provides a first communication service to a first subscriber premises, and a second electrically conductive medium provides a second communication service to a second subscriber premises:
installing an optical network unit to communicate with an optical line terminal before receiving a request to upgrade the first communication service to the first subscriber premises or the second communication service to the second subscriber premises to an optical transmission medium, the optical line terminal located at a remote terminal serving a subscriber distribution area, the optical network unit including a first optical downlink interface to serve the first subscriber premises and a second optical downlink interface to serve the second subscriber premises, the optical network unit being separate from a location of the remote terminal, the remote terminal located apart from a central office, the remote terminal in communication with the central office;
configuring the optical network unit by communicatively coupling a first removably attachable optical-to-electrical converter downlink module to the first optical downlink interface to provide the first communication service to the first subscriber premises via the first electrically conductive medium;
configuring the optical network unit by communicatively coupling a second removably attachable optical-to-electrical converter downlink module to the second optical downlink interface to provide the second communication service to the second subscriber premises via the second electrically conductive medium; and
after receiving a request to upgrade the first communication service, replacing the first removably attachable optical-to-electrical converter downlink module with a third removably attachable optical downlink module and connecting the optical transmission medium between the third removably attachable optical downlink module and the first subscriber premises while retaining the second electrically conductive medium communicatively coupled to the second optical downlink interface to provide the second communication service to the second subscriber premises.

2. The method as defined in claim 1, further including configuring a communications switch in the optical network unit to transmit information to corresponding ones of the first subscriber premises and the second subscriber premises through respective ones of the first subscriber downlink interface and the second subscriber downlink interface.

3. The method as defined in claim 1, further including, after installing the optical network unit, updating in a database, by executing an instruction with a processor, a first subscriber profile associated with the first subscriber premises and a second subscriber profile associated with the second subscriber premises to indicate that a first subscriber line associated with the first subscriber premises and a second subscriber line associated with the second subscriber premises are enabled for upgrading to an optical type of transmission medium.

4. The method as defined in claim 3, further including, after connecting the optical transmission medium between the third removably attachable subscriber downlink module and the first subscriber premises, updating in a database, by executing an instruction with the processor, the first subscriber profile associated with the first subscriber premises to indicate that the first subscriber line includes the optical transmission medium.

5. The method as defined in claim 3, wherein the first subscriber line communicatively couples the optical network unit to customer equipment at the first customer premises.

6. The method as defined in claim 1, further including monitoring in a database, by executing an instruction with a processor, a subscriber profile status record associated with the first subscriber premises, the replacing of the first removably attachable subscriber downlink module with the third removably attachable subscriber downlink module performed based on the subscriber profile status record indicating that a subscriber line of the first subscriber premises is capable of being upgraded to an optical type of transmission medium.

7. The method as defined in claim 1, wherein the subscriber distribution area is a residential neighborhood.

8. The method as defined in claim 1, wherein the first electrically conductive medium is a twisted pair wire or a coaxial cable.

9. A method of tracking subscriber line upgrading capabilities in a subscriber distribution area, the method comprising:
monitoring a database, by executing an instruction with a processor, to track transmission medium types installed between a plurality of optical network units and subscriber premises in a subscriber distribution area, the optical network units in communication with a remote terminal via optical fibers, the optical network units located separate from a location of the remote terminal, the remote terminal located apart from a central office, the remote terminal in communication with the central office;
when an electrically conductive type of transmission medium provides a first subscriber line to a first subscriber premises via a first removably attachable optical-to-electrical converter downlink module coupled to a first optical downlink interface of a first one of the optical network units, and the electrically conductive type of transmission medium provides a second subscriber line to a second subscriber premises via a second removably attachable optical-to-electrical converter downlink module coupled to a second optical downlink interface of the first one of the optical network units:
before receiving a request to upgrade the first subscriber line to the first subscriber premises or the second subscriber line to the second subscriber premises to an optical type of transmission medium, updating, by executing an instruction with the processor, a first subscriber line upgradeable entry in a first subscriber profile in the database associated with the first subscriber premises and a second subscriber line upgradeable entry in a second subscriber profile in the database associated with the second subscriber premises to indicate that the first subscriber line associated with the first subscriber premises and the second subscriber line associated with the second subscriber premises are enabled for replacement with the optical type of transmission medium; and
based on replacement of a transmission medium type of the first subscriber line, updating, by executing an instruction with the processor, a first subscriber line type entry in the first subscriber profile to indicate that the first subscriber line includes the optical type of transmission medium and maintaining a second subscriber line type entry in the second subscriber profile to indicate that the second subscriber line includes the electrically conductive type of transmission medium.

10. The method as defined in claim 9, further including configuring, by executing an instruction with the processor, a communications switch in the first one of the optical network units to transmit information to corresponding ones of the first subscriber premises and the second subscriber premises through respective ones of the first subscriber line and the second subscriber line.

11. The method as defined in claim 9, wherein the updating of the first subscriber line upgradeable entry in the first subscriber profile associated with the first subscriber premises and the second subscriber line upgradeable entry in the second subscriber profile associated with the second subscriber premises to indicate that the first subscriber line associated with the first subscriber premises and the second subscriber line associated with the second subscriber premises are enabled for replacement with the optical type of transmission medium is performed in response to installing a fiber-to-the-curb distribution system in the subscriber distribution area including the first and second subscriber premises.

12. The method as defined in claim 9, wherein the upgrading of the transmission medium type of the first subscriber line includes replacing the electrically conductive type of transmission medium associated with the first subscriber line with the optical type of transmission medium.

13. The method as defined in claim 12, wherein the electrically conductive type of transmission medium is replaced with the optical type of transmission medium in response to receiving a customer order associated with the first subscriber premises requesting services associated with a first data transmission rate capability that is relatively higher than a second data rate transmission capability of the electrically conductive type of transmission medium.

14. The method as defined in claim 9, wherein the first and second subscriber premises are first and second households in a residential neighborhood.

15. The method as defined in claim 9, wherein the first and second subscriber premises are first and second businesses.

16. An article of manufacture comprising instructions that, when executed by a processor, cause a machine to perform operations including:
maintaining a database to track transmission medium types installed between a plurality of optical network units and subscriber premises in a subscriber distribution area, the optical network units in communication with a remote terminal via optical fibers, the optical network units located separate from a location of the remote terminal, the remote terminal located apart from a central office, the remote terminal in communication with the central office;
when an electrically conductive type of transmission medium provides a first subscriber line to a first subscriber premises via a first removably attachable optical-to-electrical converter downlink module coupled to a first optical downlink interface of a first one of the optical network units, and the electrically conductive type of transmission medium provides a second subscriber line to a second subscriber premises via a second removably attachable optical-to-electrical converter downlink module coupled to a second optical downlink interface of the first one of the optical network units:

before receiving a request to upgrade the first subscriber line to the first subscriber premises or the second subscriber line to the second subscriber premises to an optical type of transmission medium, updating a first subscriber line upgradeable entry in a first subscriber profile in the database associated with the first subscriber premises and a second subscriber line upgradeable entry in a second subscriber profile associated with the second subscriber premises to indicate that the first subscriber line associated with the first subscriber premises and the second subscriber line associated with the second subscriber premises are enabled for replacement with an optical type of transmission medium; and updating a first subscriber line type entry in the first subscriber profile to indicate that the first subscriber line includes the optical type of transmission medium and maintaining a second subscriber line type entry in the second subscriber profile to indicate that the second subscriber line includes the electrically conductive type of transmission medium.

17. The article of manufacture as defined in claim 16, wherein the instructions are further to cause the machine to configure a communications switch in the first one of the optical network units to transmit information to corresponding ones of the first subscriber premises and the second subscriber premises through respective ones of the first subscriber line and the second subscriber line.

18. The article of manufacture as defined in claim 16, wherein the instructions are to cause the machine to update the first and second subscriber line upgradeable entries in response to installing a fiber-to-the-curb distribution system in the subscriber distribution area including the first and second subscriber premises.

19. The article of manufacture as defined in claim 16, wherein the instructions are to cause the machine to update the first subscriber line type entry in response to the electrically conductive type of transmission medium associated with the first subscriber line being replaced with the optical type of transmission medium.

20. The article of manufacture as defined in claim 16, wherein the instructions are further to cause the machine to generate a subscriber line upgrade request to replace the electrically conductive type of transmission medium associated with the first subscriber line with the optical type of transmission medium in response to receiving a customer order associated with the first subscriber premises requesting services associated with a first data transmission rate capability that is relatively higher than a second data rate transmission capability of the electrically conductive type of transmission medium.

21. The method as defined in claim 1, wherein the installing of the optical network unit to communicate with the optical line terminal includes connecting an optical Ethernet switch of the optical network unit to the optical line terminal via an optical fiber and connecting the optical Ethernet switch to the first and second removably attachable optical-to-electrical converter downlink modules via corresponding ones of the first and second optical downlink interfaces.

* * * * *